Sept. 1, 1970 R. L. ALDER 3,526,041
PULSE RING MOUNTING
Filed June 29, 1966 2 Sheets-Sheet 1

INVENTOR.
ROBERT L. ALDER
BY C. G. Stallings
ATTORNEY

INVENTOR.
ROBERT L. ALDER
BY C. G. Stallings
ATTORNEY

United States Patent Office 3,526,041
Patented Sept. 1, 1970

3,526,041
PULSE RING MOUNTING
Robert Lee Alder, Pasadena, Calif., assignor to Byron Jackson Inc., Long Beach, Calif., a corporation of Delaware
Filed June 29, 1966, Ser. No. 561,637
Int. Cl. E21b 47/02
U.S. Cl. 33—205                                  6 Claims

ABSTRACT OF THE DISCLOSURE

A pulse ring mounting for signaling drift indicators having a window through which the shaft knob may be removed in order to allow the pulse ring mounting to be removed from the instrument housing over the free end of the shaft.

---

The present invention relates to signaling drift indicators and, more particularly, to means for supporting on a drift indicator instrument housing the pulse ring means which cooperate with a knob during operation of the instrument to form successive restrictions to impede the flow of drilling fluid downwardly through a drill collar mounted in a well drilling string, thus producing pressure pulses or signals which will travel through the column of drilling fluid to the earth's surface for detection by a typical pressure gauge or pressure recorder as an indication of the angular disposition of the drill collar within a well bore.

Signaling draft indicators of the type to which the present invention relates are exemplified in Alder et al. Pat. No. 3,176,407, granted Apr. 6, 1965.

In the use of signaling drift indicators wherein successive restrictions are provided to cause pressure pulses in a stream of well drilling fluid, the means for creating the restrictions, and more particularly the pulse ring assembly, is subjected to successive hydraulic shock loadings which have been found to have a deleterious effect upon the connection between the pulse ring assembly and the instrument housing. Accordingly, a primary object of the present invention is to provide a mounting for a pulse ring assembly whereby the latter may be connected to the housing of a signaling drift indicator in such a manner as to endure the intermittent application of shock loadings while at the same time enabling ease of assembly and disassembly.

In the use of signaling drift indicators of the type generally here involved, connections between the pulse ring assembly and the instrument housing have been of a typical pin and slot type held together by means of removable fasteners. Such connections have not been altogether satisfactory inasmuch as tolerance in the pin and slot connection has required that the fasteners sustain the entire load when the pulse rings in cooperation with the knob moving through the pulse rings produce flow restrictions resulting in the temporary impeding of drilling fluid flow. The force applied to the connection under such circumstances results from the interruption of flow of the column of drilling fluid which is under the influence of hundreds of hydraulic horsepower. Consequently the shock loadings applied to the pulse ring mountings are rather severe and have resulted in failure of the fasteners of prior mountings with the derivative result that the pin and slot connection is broken and the pulse ring assembly may move relative to the housing, thereby interfering with the continued operation of the signaling drift indicator.

Simple welding of the connection between the pulse ring assembly and the instrument housing has not proved satisfactory inasmuch as, while the welded connection is sufficiently strong as to endure the loading to which it is subjected, it has been necessary to destroy the weld when replacement of pulse ring assemblies and/or replacement of pulse producing knobs has been necessary. Accordingly, another object of the invention is to provide a durable connection between the pulse ring assembly and the housing which not only facilitates replacement of pulse ring assemblies, but also facilitates the assembly and disassembly of knobs on the instrument shaft.

In brief, the invention resides in a signaling apparatus adapted to be installed in a well drilling string for producing pressure signals in a stream of well drilling fluid indicative of the angular disposition of the drilling string, the apparatus comprising: an elongated housing, a shaft having a free end projecting from one end of the housing, means in the housing for biasing the shaft to move longitudinally outward with respect to the housing, gravity responsive means for limiting such movement of the shaft, the free end of the shaft having thereon a knob providing means responsive to the flow of drilling fluid for moving the shaft inward with respect to the housing against the biasing means, means cooperatively engaged for removably securing the knob on the free end of the shaft, pulse ring means cooperative with the knob for producing the pressure signals during movement of the shaft inward with respect to the housing, means for mounting the pulse ring means on the housing including means providing a seat on the housing and a connection having a collar disposed on the seat, a plurality of angularly spaced arms integral with the collar and projecting longitudinally therefrom and a connector sectio connecting the arms to the pulse ring means, the connection being removable from the housing over the free end of the shaft when the knob is removed from the free end of the shaft, the knob having a diameter greater than the internal diameter of the collar, whereby the knob must be removed from the free end of the shaft to allow the connection to be removed from the housing over the free end of the shaft, and the connection having angularly spaced windows defined between the arms, the collar and the connector section, at least one of the windows providing an opening larger than the knob, whereby the knob is removable from the one end of the shaft through the one window.

Other objects and advantages of the invention will be hereinafter described or will become apparent to those skilled in the art, and the novel features of the invention will be defined in the appended claims.

In the accompanying drawings.

Like reference characters in the several views of the drawings and in the following description designate corresponding parts.

Figure 1:
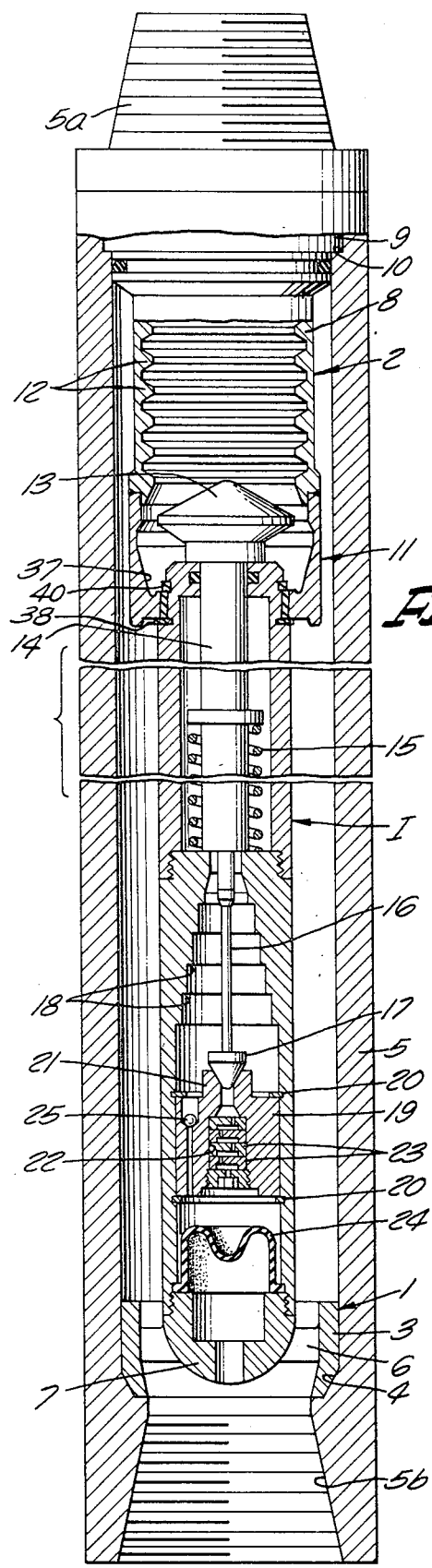
FIG. 1 is a foreshortened axial sectional view partly in elevation schematically illustrating a signaling drift indicator embodying the pulse ring mounting in accordance with the invention.

Referring first to FIG. 1, there is generally illustrated a signaling drift indicator instrument embodying the present invention. This instrument comprises an instrument housing I having at its lower end a bottom support 1 and at its upper end a pulse ring assembly 2. The bottom support 1 includes an outer sleeve 3 which seats at 4 adjacent the lower end of a sub or length of drill collar denoted at 5. The sleeve 3 is connected as by webs 6 to a bottom 7 of the housing I, so that the lower end of the housing I is concentrically supported in the drill collar 5. The pulse ring assembly 2 comprises a tubular member 8 having at its upper end a flange 9 which seats as at 10 adjacent the upper end of the drill collar 5. Inasmuch as the tubular member 8 is mounted by means of a connection generally denoted at 11 to the upper end of the instrument housing I, the entire instrument is supported within the drill collar 5.

At its upper end the drill collar or sub 5 has a threaded pin 5a whereby the same may be connected into a string of drill collars or drill pipe. At its lower end the drill collar has an internally threaded box 5b adapted to be connected to a downward extension of the drill string or to the drill bit. During the drilling of a well, drilling fluid is circulated downwardly through the drill string including drill collar or sub 5 and upwardly through the annulus outside of the drill string in the bore hole so as to remove earth cuttings as the drilling progresses.

The present signalling drift indicator is adapted to produce pressure pulses in the stream of drilling fluid as an indication of the angle at which the drill collar 5 is disposed. Such signals will be produced following cessation of circulation of drilling fluid and in response to the resumption of such circulation.

The means for producing pressure pulses comprise a series of axially spaced rings 12 formed internally of the tubular member 8 to provide a pulse ring means, in combination with a knob 13 supported on the upper end of an instrument shaft 14. The shaft 14 extends into the instrument housing I and is normally biased outwardly by a spring 15. The extent of outward movement of shaft 14 is limited by gravity responsive means comprising a pendulum or plumb bob 16 having at its lower end a head 17. This head 17 is adapted to engage with one of a series of annular shoulders 18 of progressively diminishing diameter as the shaft 14 moves upward and depending upon the angular relation between the pendulum 16 and the instrument housing I in which the shoulders 18 are provided.

Within the housing I, beneath the pendulum 16, is a member 19 supported between snap rings 20, which provides at 21 a seat for the pendulum head. This member 19 also contains in a bore 22 orifice discs 23 which are adapted to impede the downward flow of fluid such as clean oil with which the instrument housing is filled. Beneath the member 19 the instrument housing is provided with a diaphragm 24 or other suitable means for equalizing the pressure of fluid within the housing with the pressure of fluid outside the housing, this diaphragm also constitutes a movable divider which enables the shaft 14 to move upwardly under the balanced pressure conditions as fluid within the instrument housing passes upwardly through an upwardly opening check valve 25 in member 19.

It will now be understood that the downward flow of drilling fluid through the sub or drill collar 5 impinging upon the knob 13 will normally force the shaft 14 to the position shown in FIG. 1, wherein the pendulum is seated on seat 21, but when such downward flow of drilling fluid is halted, the spring 15 will bias shaft 14 upward, diaphragm 24 being displaced inwardly by external drilling fluid and the internal clean fluid bypassing member 19 through check valve 25. Such upward movement of the shaft 14 and knob 13 thereon will result in the knob traversing a number of pulse rings 12 related to the angular disposition of the instrument housing I, due to engagement of the pendulum head 17 with one of the stop shoulders 18. Thus when circulation of drilling fluid is resumed, downward movement of the knob 13 through successive pulse rings 12 will result in successive pressure signals or pulses due to the fact that knob 13 forms with each pulse ring 12 a restricted flow area. Moreover, inasmuch as downward movement of shaft 14 must cause displacement of internal fluid within the instrument housing I through the orifice discs 23, the rate of downward movement of the knob 13 will be retarded so that the frequency of the pressure pulses will be such that the pulses transmitted to the earth's surface through the column of drilling fluid will be discretely viewable on the surface pressure gauge or recordable on the surface pressure recorder.

While the instrument herein generally illustrated in FIG. 1 is so constructed that the number of pulses produced upon each operation of the instrument will be inversely related to the angle of disposition of the instrument housing, due to the fact that the knob 13 will move upwardly through a greater number of rings the smaller the angle of deviation, it will be understood that the instrument may also be constructed so that the number of pulses produced will be directly related to the angle of deviation in accordance with the invention disclosed and claimed in the aforementioned prior patent.

It will also now be recognized that during each operation of the signaling drift indicator, as the knob 13 passes downwardly through pulse rings 12 causing a substantial restriction to flow, there will be produced at each pulse ring an axial loading of the latter which is a function of the fluid column flow and pressure, and such loading will be transmitted to the connection 11 referred to above between the tubular member 8 having the pulse rings 12 therein and the upper end of the instrument housing I. Repetitive loading of such connections in prior instruments has caused failure of the connection but, in accordance with the present invention, a more durable connection is provided.

Referring more particularly to FIGS. 2 through 5, it will be noted that the tubular member 8 containing the pulse rings 12 is provided with a downwardly extended connector section 30 of tubular configuration. In the illustrative embodiment, the tubular member 8 is a separate member welded as at 31 to the connector section 30 but it will be recognized that if desired these two components may be formed of a single element or they may be otherwise integrated. In any event, the connector section 30 comprises a downwardly extending connector sleeve portion 32 having a plurality of angularly spaced downwardly extending arms 33. In the illustrative embodiment there are two such arms 33 disposed in diametrical relation and integrally formed with a support collar 34 at their lower extremities. Within the collar 34 is a bore 35 of a diameter such as to receive the upper end of the instrument housing I. If desired, a resilient bushing 36 may be disposed in the bore 35, in which event the bushing 36 will closely fit the instrument housing I. Between the upper extremity of the collar 34, the lower extremity of sleeve portion 32 and between the arms 33, is a pair of windows 37. These windows not only enable the flow of drilling fluid therethrough, but also the windows have sufficient axial extent, i.e., the axial space between sleeve portion 32 and collar 34 is sufficient, to enable the connection of the knob 13 with the upper extremity of shaft 14. It will be noted that the knob 13 is larger in diameter than the support collar 34, and that at least one of the windows 37 provides an opening larger than the knob, whereby the knob is connectible to the end of the shaft 14 through the said one window.

Figure 2:
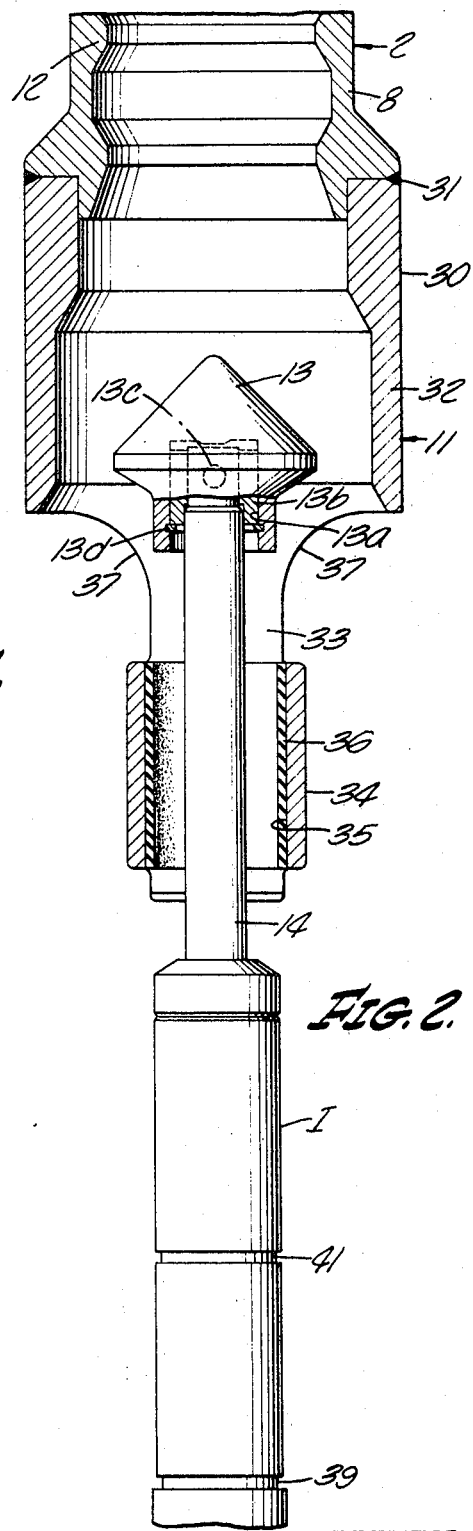
FIG. 2 is a fragmentary axial sectional view on an enlarged scale partially in elevation more particularly showing the details of the upper end of the signaling drift indicator instrument housing of FIG. 1 with the pulse ring assembly in position for connection with the housing, but illustrated at right angles relative to FIG. 1.
Figure 4:
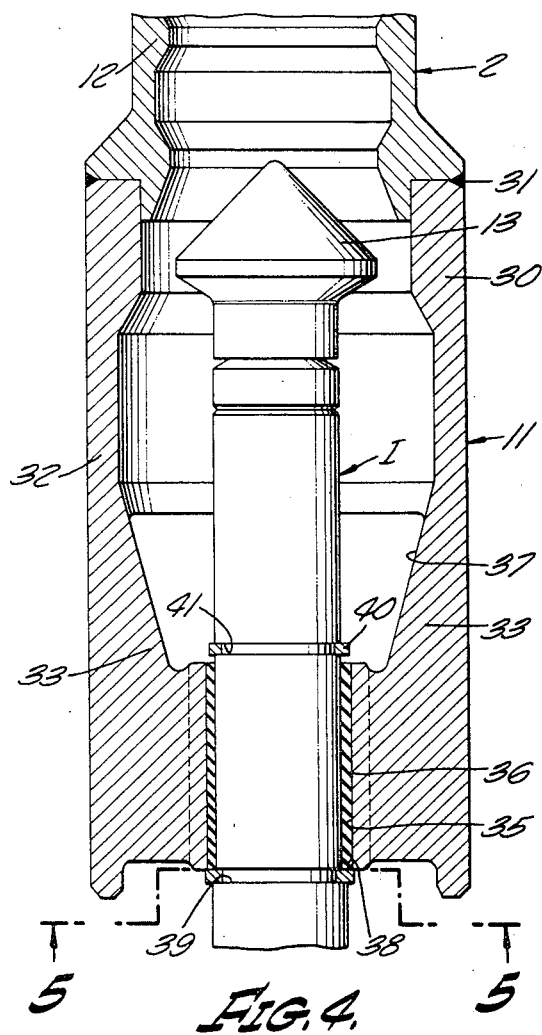
FIG. 4 is a view in section as taken on the line 4—4 of FIG. 3, certain of the parts being shown in elevation.

Referring to FIG. 2, it will be noted that the knob 13 is removably supported upon shaft 14. The knob 13 has an internal bore 13a in which is bushing 13b. Bushing 13b is connected to the upper end of shaft 14 by a pin 13c.

Within the bore 13a beneath the sleeve 13b there is installed a snap ring 13d which abuts with the lower end of bushing 13b. Thus the upper end of shaft 14, minus the knob 13, may be inserted through the collar 34, and thereupon the knob 13 may be slipped on to the end of shaft 14 and a suitable implement may be employed to install the snap ring 13d within the bore 13a so as to secure the knob 13 in place.

Figure 3:
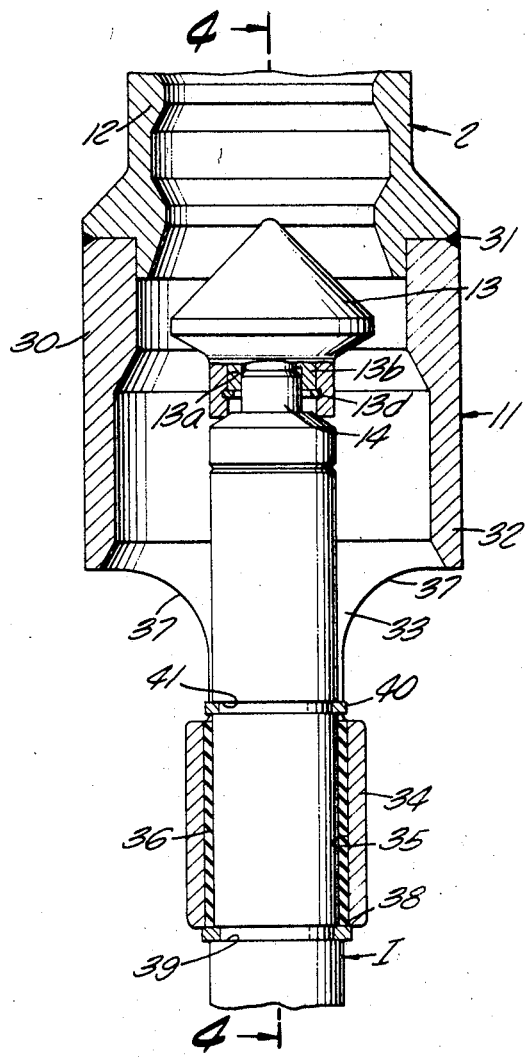
FIG. 3 is a view corresponding to FIG. 2 but showing the pulse ring assembly mounted on the instrument housing.
Figure 5:
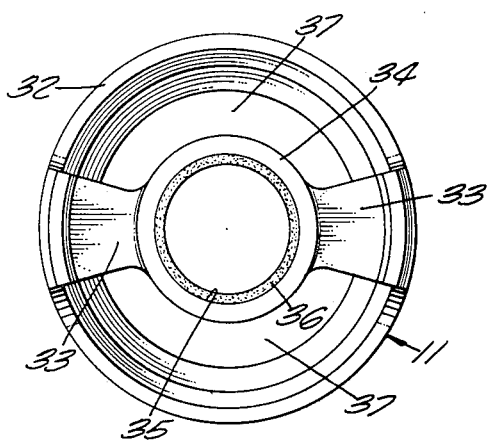
FIG. 5 is a transverse view as taken on the line 5—5 of FIG. 4 and looking in the direction of the arrows, with the instrument assembly and pulse ring omitted.

Thereafter, as shown in FIG. 3, the collar 34 may be moved downwardly over the upper end of the instrument housing I into engagement with a stop shoulder 38 which, in the illustrative embodiment, is constituted by a snap ring installed in a groove 39 in the instrument housing I. Finally, an upper snap ring 40 may be installed in a groove 41 in instrument housing I disposed above the collar 34 so that the latter will be secured in place upon the instrument housing, the windows 37 enabling access to the housing I to install the snap ring 40.

It will now be recognized that the pulse ring assembly 2 comprises the tubular member 8 and the connection 11. The connection 11 includes the connector section 30 (including a sleeve portion 32), the arms 33 and the support collar 34, and may be composed, as shown, of a rugged unitary casting capable of withstanding the severe shock loadings to which the connection is subjected during the use of the drift indicator. Yet the connection 11 with its tubular member 8 may be installed on the housing I with facility. Therefore, the problems attending the prior devices including pin and groove type connections and fastener elements which fail under repeated loadings as well as the more durable welded connections of the pulse ring assembly to the housing are avoided, and a durable connection is afforded.

While the specific details of the invention have been herein shown and described, changes and alterations may be resorted to without departing from the spirit of the invention.

I claim:

1. A signalling apparatus adapted to be installed in a well drilling string for producing pressure signals in a stream of well drilling fluid indicative of the angular disposition of the drilling string, said apparatus comprising: an elongated housing (I), a shaft (14) having a free end projecting from one end of said housing (I), means (15) in said housing for biasing said shaft (14) to move longitudinally outward with respect to said housing (I), gravity responsive means (16, 17, 18) for limiting such movement of said shaft (14), said free end of said shaft (14) having thereon a knob (13) providing means responsive to the flow of drilling fluid for moving said shaft (14) inward with respect to said housing (I) against said biasing means (15), means (13b, 13d) cooperatively engaged for removably securing said knob (13) on said free end of said shaft (14), pulse ring means (8, 12) cooperative with said knob (13) for producing said pressure signals during movement of said shaft (14) inward with respect to said housing (I), means for mounting said pulse ring means (8, 12) on said housing (I) including means (38, 40) providing a seat (38-41) on said housing, and a connection (11) having a collar (34) disposed on said seat (38-41), plurality of angularly spaced arms (33) integral with said collar (34) and projecting longitudinally therefrom and a connector section (30) connecting said arms (33) to said pulse ring means (8, 12), said connection (11) being removable from said housing (I) over said free end of said shaft (14) when said knob (13) is removed from said free end of said shaft (14), said knob (13) having a diameter greater than the internal diameter of said collar (34), whereby said knob (13) must be removed from said free end of said shaft (14) to allow said connection (11) to be removed from said housing (I) over said free end of said shaft (14), and said connection (11) having angularly spaced windows (37) defined between said arms (33), said collar (34) and said connector section (30), at least one of said windows (37) providing an opening larger than said knob (13), whereby said knob (13) is removable from said one end of said shaft (14) through said one window (37).

2. A signalling apparatus as defined in claim 1, wherein said seat (38-41) comprises a cylindrical section on said housing (I), means (38) forming a lower abutment at the lower end of said cylindrical section, and means (40) providing a detachable abutment at the upper end of said cylindrical section, said collar (34) being mountable on said cylindrical section between said abutments.

3. A signalling apparatus as defined in claim 2, wherein a resilient bushing (36) is interposed between said cylindrical section and said collar (34).

4. A signalling apparatus as defined in claim 1, wherein said means (13b, 13d) cooperatively engaged comprise a radial shoulder (13b) on said free end of said shaft (14), said knob (13) having a cavity for reception of said end of said shaft (14) and said shoulder (13b), and means (13d) removably connected to said knob (13) and engageable with said shoulder (13b).

5. A signalling apparatus as defined in claim 1, wherein said connector section (30) comprises a tubular member (30) depending from said pulse ring means (8, 12) and terminating in longitudinally spaced relation to and above said collar (34).

6. A signalling apparatus as defined in claim 1, wherein said shaft (14) normally extends into said pulse ring means (8, 12), and said housing (I) has means (40) for releasably holding said collar (34) on said seat (38, 41), whereby upon release of said last named means (40) said housing (I) and said shaft (14) as a unit are movable relative to said collar (34) to dispose said free end of said shaft (14) adjacent said one window (37).

References Cited

UNITED STATES PATENTS 3,176,407    4/1965    Alder et al.

WILLIAM D. MARTIN, JR., Primary Examiner

U.S. Cl. X.R.

73—155